United States Patent [19]

Noguchi et al.

[11] Patent Number: 5,231,547
[45] Date of Patent: Jul. 27, 1993

[54] SYSTEM FOR CONTROLLING POSITIONS OF RECORD TRACKS RELATIVE TO A SCANNING TRACE OF A HEAD DEVICE BY USE OF TWO ENVELOPE OUTPUT SIGNAL ENVELOPE SAMPLINGS DURING A SCANNING TRACE

[75] Inventors: Masayoshi Noguchi, Chiba; Makoto Yamada, Tokyo, both of Japan

[73] Assignee: Sony Corporation, Tokyo, Japan

[21] Appl. No.: 629,619

[22] Filed: Dec. 18, 1990

[30] Foreign Application Priority Data

Dec. 30, 1989 [JP] Japan .................................. 1-340271

[51] Int. Cl.$^5$ ............................................. G11B 19/28
[52] U.S. Cl. .................................... 360/70; 360/10.1
[58] Field of Search .................... 360/10.2, 10.3, 70, 360/77.13, 72.2

[56] References Cited

U.S. PATENT DOCUMENTS

| | | | |
|---|---|---|---|
| 4,104,684 | 8/1978 | Wakami et al. | 360/70 |
| 4,338,631 | 7/1982 | Ota | 360/70 |
| 5,003,406 | 3/1991 | Hatanaka et al. | 360/10.3 |
| 5,119,246 | 6/1992 | Tomitaka | 360/70 |

FOREIGN PATENT DOCUMENTS

| | | |
|---|---|---|
| 0169479 | 1/1986 | European Pat. Off. . |
| 0194445 | 9/1986 | European Pat. Off. . |
| 2009998A | 6/1979 | United Kingdom . |

OTHER PUBLICATIONS

Patent Abstracts of Japan, Hayamizu Atsushi, "Tracking Control Signal Generator", Mar. 24, 1987.
8087 IEEE Trans. on Consumer Electronics, vol. CE-26, No. 1, Feb., 1980, "Microprocessor Controlled Variable Play-Back Speed System for Video Tape Recorder", Nobuo Azuma et al., pp. 121-128.

*Primary Examiner*—Joseph L. Dixon
*Assistant Examiner*—David L. Robertson
*Attorney, Agent, or Firm*—Hill, Steadman & Simpson

[57] ABSTRACT

A system is provided for controlling positions of record tracks relative to a scanning trace of a head device. An envelope detector detects an envelope of an output from a head device operative to scan a record tape along a scanning path transverse to record tracks. A pulse generator produces two pulses appearing respectively at predetermined time points in a period of a scanning trace of the head device. A level sampler samples a level of a detection output from the envelope detector with the pulses produced by the pulse generator to produce two sampled outputs. An improper position detector detects improper positioning of a group of record tracks traversed by the head device relative to the scanning trace of the head device based on a difference between the sampled outputs from the level sampler. A tape controller adjusts a travelling speed of the record tape to control positions of the record tracks traversed by the head device relative to the scanning trace of the head device in response to a detection output from the improper position detecting circuit.

9 Claims, 3 Drawing Sheets

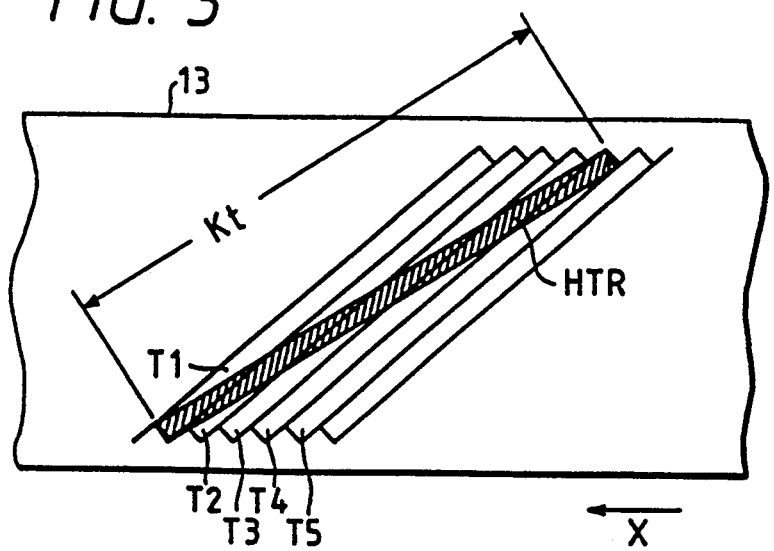
FIG. 3
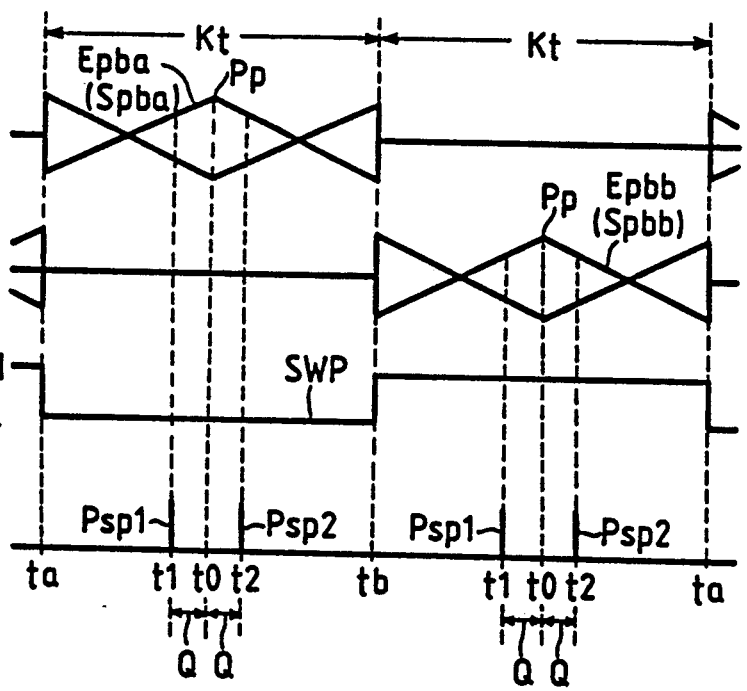
FIG. 4A
FIG. 4B
FIG. 4C
FIG. 4D
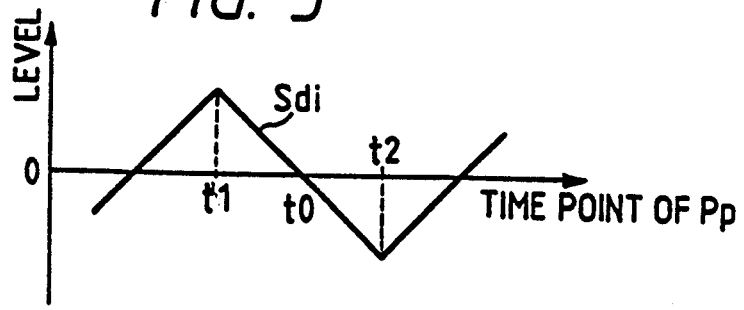
FIG. 5

SYSTEM FOR CONTROLLING POSITIONS OF RECORD TRACKS RELATIVE TO A SCANNING TRACE OF A HEAD DEVICE BY USE OF TWO ENVELOPE OUTPUT SIGNAL ENVELOPE SAMPLINGS DURING A SCANNING TRACE

BACKGROUND OF THE INVENTION

1. Field of the Invention

The present invention relates generally to a system for controlling positions of record tracks relative to a scanning trace of a head device, and more particularly, to a control system for adjusting travelling speed of a record tape to control positions of record tracks formed on the record tape relative to a scanning trace of a reproducing head device which is driven to scan the record tape along a scanning path transverse to the record tracks on the record tape.

2. Description of the Prior Art

There has been proposed a so-called digital audio tape recorder (referred to as DAT, hereinafter) which is operative in a recording operation mode to convert an audio signal into digital data and to record the digital data based on the audio signal onto a magnetic record tape with increased recording density. The recorder is further operative in a reproducing operation mode to read digital data, based on audio from a magnetic record tape on which the digital data are recorded with increased recording density, and to convert the digital data read from the magnetic record tape into the audio signal. In the DAT, a pair of rotary magnetic heads are mounted on a rotary head cylinder to be disposed at angular intervals of, for example 180 degrees therebetween, for scanning alternatively the magnetic record tape which is wound on the rotary head cylinder. In the recording operation mode, the digital data obtained based on the audio signal are supplied to the rotary magnetic heads to be recorded in record tracks formed on the magnetic record tape successively by each of the rotary magnetic heads; and in the reproducing operation mode, the digital data of the audio signal read from the record tracks on the magnetic record tape are derived alternatively from each of the rotary magnetic heads.

In the reproducing operation mode of the DAT, it is usual that a normal reproduction is performed with the rotary magnetic heads which scan alternately the magnetic record tape to trace each of the record tracks thereon so that the digital data recorded in each record track are fully and continuously reproduced. With such a system a fast-forward reproduction occurs in which the rotary magnetic heads scan alternately the magnetic record tape along a scanning path transverse to a plurality of record tracks on the magnetic tape. Thus, the digital data recorded in each of the record tracks traversed by the rotary magnetic head are partially and intermittently reproduced. This is desired to be performed in addition to the normal reproduction.

In view of this, it has been also proposed in the field of the DAT to cause the magnetic record tape on which the digital data of the audio signal are recorded in the record tracks to travel at a speed higher than that in normal reproduction so that a plurality of record tracks on the magnetic record tape are traversed by the rotary magnetic head on each scanning of the magnetic record tape; and the digital data recorded in each of the record tracks traversed by the magnetic record head are partially and intermittently reproduced.

However, in the case of fast-forward reproduction thus proposed previously, the positions of the record tracks traversed by the rotary magnetic head relative to a scanning trace of the rotary magnetic head on the magnetic record tape are uncertain; and the level of the digital data of the audio signal read partially from each of the record tracks traversed by the rotary magnetic head at each scanning of the magnetic record tape is directly influenced by variations in the positions of the record tracks relative to the scanning trace of the rotary magnetic head. This results in a disadvantage that a reproduced audio signal obtained in fast-forward reproduction by the DAT is not stabilized in level, and thus sound obtained based on the reproduced audio signal becomes harsh to the ear.

OBJECTS AND SUMMARY OF THE INVENTION

Accordingly, it is an object of the present invention to provide a system for controlling position of record tracks relative to a scanning trace of a head device operative to scan a record tape along a scanning path transverse to the record tracks thereon, and which avoids the aforementioned disadvantages encountered with the prior art.

Another object of the present invention is to provide a system for controlling positions of record tracks relative to a scanning trace of a head device operative to scan a record tape along a scanning path transverse to the record tracks thereon in a DAT, by which digital data of an audio signal read partially from each of the record tracks traversed by the head device on each scanning to the record tape is stabilized in level.

A further object of the present invention is to provide a system for controlling positions of record tracks relative to a scanning trace of a head device operative to scan a record tape along a scanning path transverse to the record tracks thereon in a DAT; and wherein the positions of the record tracks traversed by the head relative to the scanning trace of the head device on the record tape are controlled to be appropriate for the level of digital data of an audio signal read partially from each of the record tracks traversed by the head.

According to the present invention, there is provided a system for controlling positions of record tracks relative to a scanning trace of a head device. An envelope detecting circuit detects an envelope of an output signal obtained from a head device which is operative to scan a record tape along a scanning path transverse to record tracks thereon for reading information recorded in each of the record tracks and producing an envelope detecting output signal. A pulse generator produces a couple of pulses appearing respectively at predetermined time points in a period of time wherein a scanning trace of the head device is completed on the record tape. A sampling circuit samples a level of the envelope detection output signal obtained from the envelope detecting circuit with the pulses produced by the pulse generator and produces a couple of sampled output signals. An improper detecting circuit detects improper positioning of a group of record tracks traversed by the head device relative to the scanning trace of the head device based on a difference between the sampled output signals obtained from the sampling circuit. A control signal is produced based on the positions detected thereby. A tape controller adjusts the travelling speed of the record tape to control positions of the record tracks traversed by the head device relative to the scanning trace of the head device in response to the control signal obtained from the improper position detecting circuit so that a predetermined difference between the sampled output signals obtained from the sampling circuit is obtained in the improper position detecting circuit.

In the system in accordance with the present invention, when the head device scans the record tape along the scanning path transverse to the record tracks formed on the record tape, the improper positioning of the group of record tracks traversed by the head device relative to the scanning trace of the head device is detected by comparing the levels of the envelope of the output signal from the head device by which the information recorded in each of the record tracks is read and which is obtained respectively at the predetermined time points in the period of time corresponding to each scanning trace of the head device. The travelling speed of the record tape is adjusted to control positions of the record tracks traversed by the head device relative to the scanning trace of the head device in response to the detected improper positioning of the group of record tracks relative to the scanning trace of the head. Thus, the predetermined difference is obtained between the levels of the envelope of the output signal from the head device obtained respectively at the predetermined time points in the period of time corresponding to each scanning trace of the head device. Consequently, the positions of the record tracks traversed by the head relative to the scanning trace of the head device are chosen to be appropriate for the level of the output signal from the head device and therefore a reproduced signal obtained based on the output signal from the head device is stabilized in level.

The system according to the present invention is suitable for being applied to a signal reproducing section of a DAT. When the system according to the present invention is applied to the signal reproducing section of the DAT for causing a head device to scan a record tape along a scanning path transverse to record tracks formed on the record tape with digital data recorded therein, a reproduced audio signal is obtained based on digital data read partially and intermittently from the record tracks on the record tape by the head device on each scanning trace traversing the record tracks. This reproduced audio signal is stabilized in level and thus sound obtained based on the reproduced audio signal becomes agreeable to the ear.

The above, and other objects, features and advantages of the present invention will become apparent from the following detailed description, which is to be read in conjunction with the accompanying drawings.

BRIEF DESCRIPTION OF THE DRAWINGS

FIG. 3 is an illustration used for explaining the scanning operation of a head device in the embodiment shown in FIG. 2;

FIGS. 4A to 4D are waveform diagrams used for explaining the operation of the embodiment shown in FIG. 2; and FIG. 5 is a time chart used for explaining improper positioning of a group of record tracks relative to a scanning trace of a head device operative to scan a record tape along a scanning path transverse to the group of record tracks formed thereon.

DETAILED DESCRIPTION OF THE PREFERRED EMBODIMENT

Figure 1:
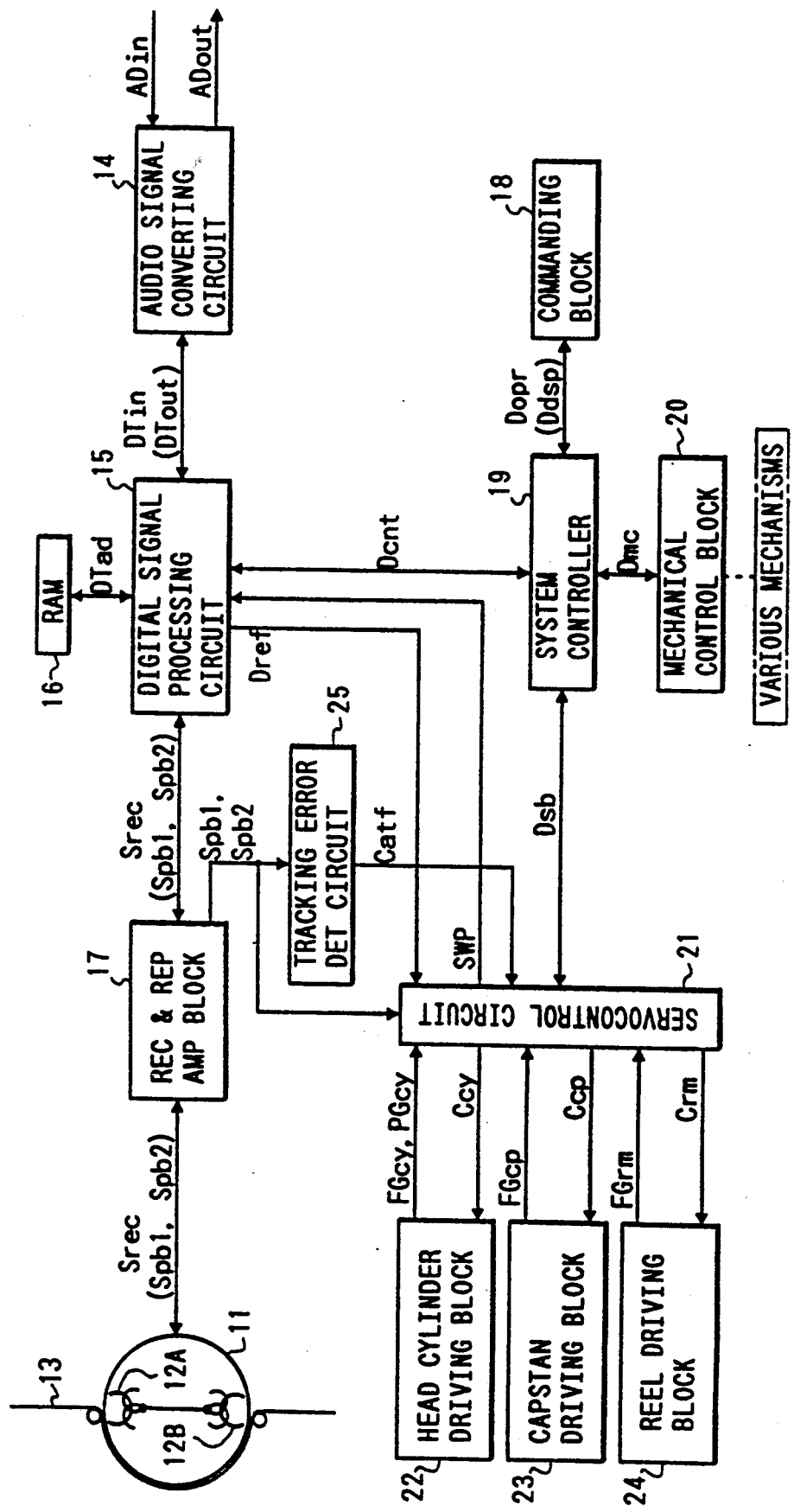
FIG. 1 is a schematic block diagram showing a DAT to which one embodiment of the system for controlling positions of record tracks relative to a scanning trace of a head device according to the present invention is applied.

FIG. 1 shows schematically a DAT having one embodiment of a system for controlling positions of record tracks relative to a scanning trace of a head device according to the present invention.

In the DAT shown in FIG. 1, an input audio signal ADin is recorded on a magnetic record tape 13 wound on a rotary head cylinder 11 with a wrapping angle of slightly larger than 180 degrees by rotary magnetic heads 12A and 12B mounted on the rotary head cylinder 11. An output audio signal ADout is reproduced from the magnetic tape 13. The DAT is provided with a commanding block 18 comprising a microcomputer accompanied with a keyboard having a number of command keys and an indicating device connected to the microcomputer. The commanding block 18 produces command data Dopr in accordance with operations on the command keys of the keyboard, and supplies the same to a system controller 19. The system controller 19 is operative to cause the DAT to enter a recording operation mode or a reproducing operation mode in response to the command data Dopr from the commanding block 18 and further to supply the commanding block 18 with indication data Ddsp representing the recording or reproducing operation mode taken by the DAT so as to cause the indicating device contained in the commanding block 18 to work in accordance with the indication data Ddsp. The system controller 19 also produces mechanism control data Dmc which are supplied to a mechanical control block 20, signal control data Dcnt which are applied to a digital signal processing circuit 15, and servocontrol data Dsb which are supplied to a servocontrol circuit 21 in response to the command data Dopr from the commanding block 18.

In response to the mechanism control data Dmc from the system controller 19, the mechanical control block 20 is operative to control operations of various mechanisms including a tape cassette loading and unloading mechanism by which a tape cassette containing the magnetic record tape 13 is loaded on or unloaded from the DAT, a tape loading and unloading mechanism by which the magnetic record tape 13 is loaded on or unloaded from the rotary head cylinder 11, etc. The servocontrol circuit 21 is operative to supply a head cylinder driving block 22 for rotating the rotary head cylinder 11, a capstan driving block 23 for causing the magnetic record tape 13 to travel, and a reel driving block 24 for driving a tape reel contained in the tape cassette with a cylinder control signal Ccy, a capstan control signal Ccp, and a reel control signal Crm, respectively, in response to the servocontrol data Dsb from the system controller 19. The head cylinder driving block 22 produces a signal FGcy representing the rotational speed of the rotary head cylinder 11 and a signal PGcy representing the rotational phase of the rotary head cylinder 11. These signals are fed back to the servocontrol circuit 21 so that speed and phase servocontrols for the rotary head cylinder 11 are carried out. The capstan driving block 23 produces a signal FGcp representing the rotational speed of the capstan and feeds it to the servocontrol circuit 21 so that a speed servocontrol for the capstan is carried out. The reel driving block 24 produces a signal FGrm representing the rotational speed of the tape reel contained in the tape cassette and feeds it to the servocontrol circuit 21 so that a speed servocontrol for the tape reel is carried out.

The servocontrol circuit 21 is supplied from the digital signal processing circuit 15 with an internal reference signal Dref representing each period of interleaving processed in the digital signal processing circuit 15 and performs the speed and phase servocontrols for the rotary head cylinder 11 so that the rotary head cylinder 11 is rotated at a predetermined speed in synchronism and in phase with the internal reference signal Dref. Furthermore, the servocontrol circuit 21 is operative to produce a reference switching signal SWP in response to both of the signals FGcy and PGcy from the head cylinder driving block 22, and to supply the digital signal processing circuit 15 with the reference switching signal SWP.

When the recording operation mode is taken in accordance with the command data Dopr supplied from the commanding block 18 to the system controller 19, the input audio signal ADin is supplied to an audio signal converting circuit 14 which comprises a first circuit path including an analog to digital (A/D) converter and a second circuit path including a digital to analog (D/A) converter. The input audio signal ADin is caused to pass through the first circuit path in the audio signal converting circuit 14, and is converted by the A/D converter into input digital data DTin which are supplied to the digital signal processing circuit 15. The input digital data DTin are formed to be, for example, 8-bit code data.

The input digital data DTin supplied to the digital signal processing circuit 15 are first memorized in a random access memory (RAM) 16 as audio data DTad. In the digital signal processing circuit 15, the audio data DTad are read from the RAM 16 to be provided with parity bits for error correction, and are subjected to a cross-interleave process. The audio data DTad previously subjected to the cross-interleave process are then subjected to bit-conversion in which 8-bit code data are converted into 10-bit code data. The audio data DTad thus formed to be 10-bit code data are further provided with synchronous data, automatic track following (ATF) data, and various other data added thereto, and are then subjected to modulation for producing a recording signal Srec.

The recording signal Srec obtained from the digital signal processing circuit 15 is supplied through a recording amplifier contained in a recording and reproducing amplifying block 17 to the rotary magnetic heads 12A and 12B which are mounted on the rotary head cylinder 11 to be positioned at angular intervals of 180 degrees therebetween. The rotary magnetic heads 12A and 12B are provided with respective different gap azimuth angles, and are rotated by the rotary head cylinder 11 to alternately scan the magnetic record tape 13 obliquely. Consequently, the recording signal Srec is recorded in oblique record tracks arranged in parallel on the magnetic record tape 13, every other one of which is formed by the rotary magnetic head 12A and another every other one of which is formed by the rotary magnetic head 12B.

On the other hand, when the reproducing operation mode is taken in accordance with the command data Dopr supplied from the commanding block 18 to the system controller 19, the servocontrol circuit 21 performs the speed and phase servocontrols for the rotary head cylinder 11 so that the rotary head cylinder 11 is rotated at a speed determined in accordance with the servocontrol data Dsb supplied from the system controller 19 in synchronism and in phase with the internal reference signal Dref supplied from the digital signal processing circuit 15. Under such servocontrols, the rotary magnetic heads 12A and 12B are rotated together with the rotary head cylinder 11 to alternately scan the magnetic record tape 13 on which the oblique record tracks are formed and to produce respective output signals Spb1 and Spb2 read from the oblique record tracks.

The output signals Spb1 and Spb2 obtained alternately from the rotary magnetic heads 12A and 12B are supplied through a reproducing amplifier contained in the recording and reproducing amplifying block 17 to the digital signal processing circuit 15, a tracking error detecting circuit 25, and the servocontrol circuit 21.

In the digital signal processing circuit 15, the output signals Spb1 and Spb2 are successively subjected to demodulation for producing reproduced audio data in the form of 10-bit code data. The reproduced audio data are then subjected to a bit-conversion in which 10-bit code data are converted into 8-bit code data. The reproduced audio data in the form of 8-bit code data thus obtained are decoded to be subjected to error correction and then memorized in the RAM 16 as digital data which has been processed through error correction. After that, the digital data are read from the RAM 16 and are supplied as reproduced digital data DTout from the digital signal processing circuit 15 to the audio signal converting circuit 14. The reproduced digital data DTout is passed through the second circuit path in the audio signal converting circuit 14, and is converted by the D/A converter included in the second circuit path into the output audio signal ADout derived from the audio signal converting circuit 14.

The tracking error detecting circuit 25, to which the output signals Spb1 and Spb2 alternately obtained from the rotary magnetic heads 12A and 12B are supplied, is operative to detect the amount of deviation of the scanning trace of each of the rotary magnetic head 12A and 12B from the center of each oblique record track traced by the rotary magnetic head 12A or 12B based on the synchronous data and the ATF data reproduced from the output signals Spb1 and Spb2. A tracking error signal Catf is then produced having a level varying in proportion to the amount of deviation detected thereby. The tracking error signal Catf obtained from the tracking error detecting circuit 25 is supplied to the servocontrol circuit 21.

In the case of normal reproduction, the servocontrol circuit 21 is operative to control the capstan driving block 23 with the capstan control signal Ccp produced in response to the tracking error signal Catf supplied from the tracking error detecting circuit 25 for causing the magnetic record tape 13 to travel at such a speed that the rotary magnetic heads 12A and 12B trace alternately and correctly each oblique record track on the magnetic record tape 13.

On the other hand, in the case of fast-forward reproduction which is performed with the rotary magnetic heads 12A and 12B scanning the magnetic record tape 13 along a scanning path transverse to a plurality of oblique record tracks on the magnetic record tape 13, the servocontrol circuit 21 is operative to control the capstan driving block 2 for causing the magnetic record tape 13 to travel at such a speed higher than that in the normal reproduction that positions of the oblique record tracks traversed by each of the rotary magnetic heads 12A and 12B relative to the scanning trace of each of the rotary magnetic heads 12A and 12B are appropriately set.

Figure 2:
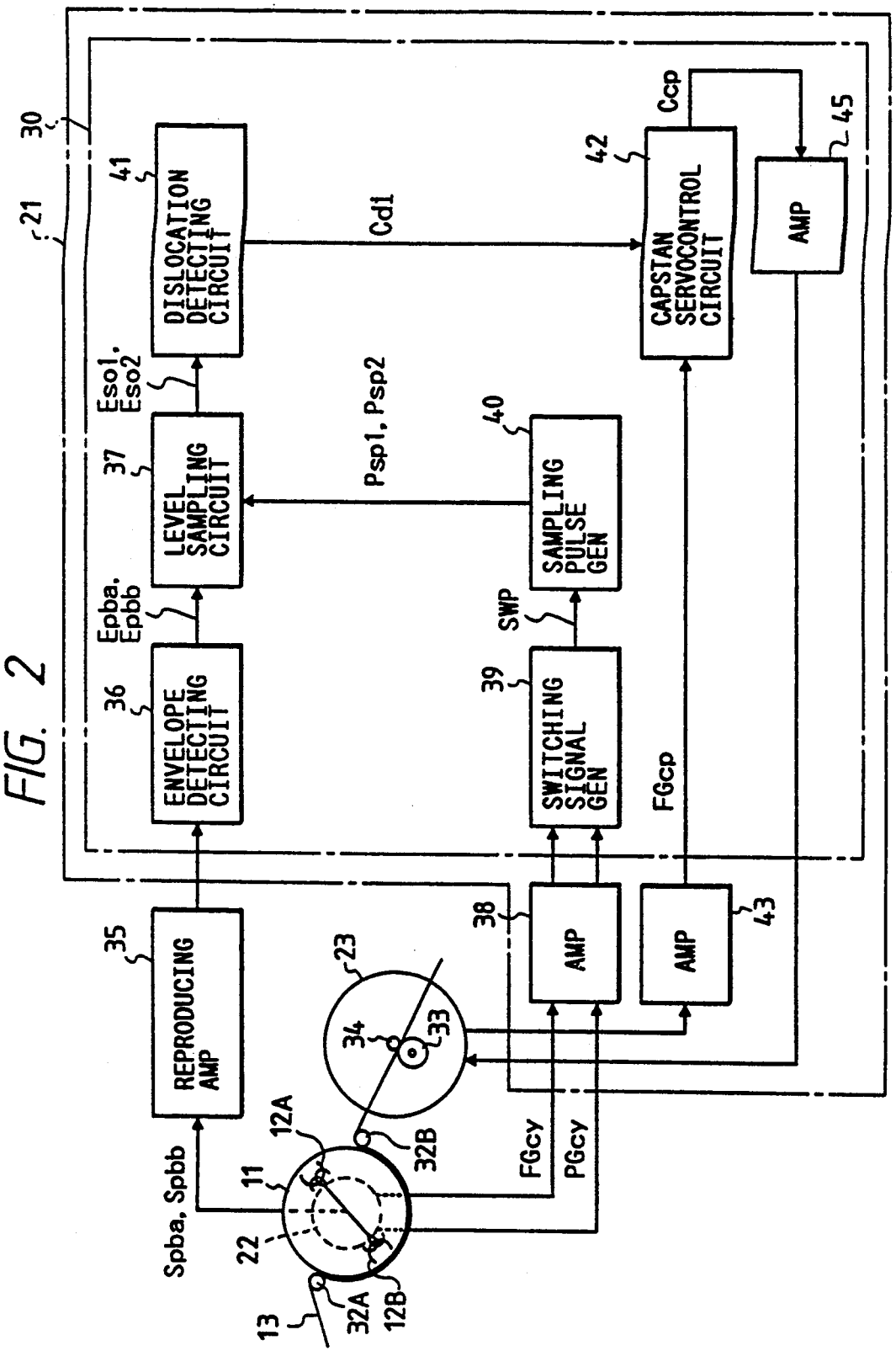
FIG. 2 is a schematic block diagram showing one embodiment of the system for controlling positions of record tracks relative to a scanning trace of a head device according to the present invention.

FIG. 2 shows the embodiment of the system according to the present invention which is applied to the servocontrol circuit 21 of the DAT shown in FIG. 1.

In FIG. 2, the embodiment of the system according to the present invention constitutes a track position control system 30 contained in the servocontrol circuit 21. The track position control system 30 is set to operate, by way of example, in response to a condition of fast-forward reproduction wherein the magnetic record tape 13 which is wound on the rotary head cylinder 11 with the wrapping angle of slightly larger than 180 degrees under the guidance of guide pins 32A and 32B is caused by a pinch roller 33 and a capstan 34 to travel at a speed higher than that in the normal reproduction. Thus, each of the rotary magnetic heads 12A and 12B scans the magnetic record tape 13 along a scanning path transverse to five successive oblique record tracks on the tape, as shown in FIG. 3.

In the condition shown in FIG. 3, a scanning trace HTR of one of the rotary magnetic heads 12A and 12B obliquely traverses record tracks T1 to T5 arranged successively on the magnetic record tape 13 which travels in the direction shown by an arrow X. The output signal of the rotary magnetic head 12A or 12B by which the scanning trace HTR is formed is obtained from a portion of every other one of the record tracks T1 to T5. In other words, it is obtained from each of the record tracks T1, T3 and T5 which have been formed by the rotary magnetic head 12A or 12B by which the scanning trace HTR is formed or a rotary magnetic head having its gap azimuth angle corresponding to that of the rotary magnetic head 12A or 12B by which the scanning trace HTR is formed. A period Kt of the scanning trace HTR is determined in accordance with the rotational speed of each of the rotary magnetic heads 12A and 12B, regardless of the travelling speed of the magnetic record tape 13.

Referring back to FIG. 2, output signals Spba and Spbb obtained from the rotary magnetic heads 12A and 12B, which each scan the magnetic record tape 13 to form the scanning trace obliquely traversing the five successive oblique record tracks T1 to T5 on the magnetic record tape 13 as shown in FIG. 3, are successively supplied through a reproducing amplifier 35 to an envelope detecting circuit 36 in the track position control system 30. The envelope detecting circuit 36 is operative to produce an envelope detection output signal Epba based on the output signal Spba obtained from the rotary magnetic head 12A during each period of the scanning trace HTR of the rotary magnetic head 12A as shown in FIG. 4A. The circuit 36 also produces an envelope detecting output signal Epbb based on the output signal Spbb obtained from the rotary magnetic head 12B during each period of the scanning trace HTR of the rotary magnetic head 12B. This is successive to the period of the scanning trace HTR of the rotary magnetic head 12A, as shown in FIG. 4B. The envelope detection output signals Epba and Epbb thus obtained are supplied to a level sampling circuit 37.

The signal FGcy representing the rotational speed of the rotary head cylinder 11, and the signal PGcy representing the rotational phase of the rotary head cylinder 11, are supplied from the head cylinder driving block 22 through an amplifier 38 included in the servocontrol circuit 21 to a switching signal generator 39 in the track position control system 30. The switching signal generator 39 produces a reference switching signal SWP in response to both of the signals FGcy and PGcy. As shown in FIG. 4C, the reference switching signal SWP has a low level during the period Kt of the scanning trace HTR of the rotary magnetic head 12A, and a high level during the period Kt of the scanning trace HTR of the rotary magnetic head 12B. Thus, a falling edge of the reference switching signal SWP appears at a time point ta at which the period Kt of the scanning trace HTR of the rotary magnetic head 12B terminates. Simultaneously, the period Kt of the scanning trace HTR of the rotary magnetic head 12A commences and a rising edge of the reference switching signal SWP appears at a time point tb at which the period Kt of the scanning trace HTR of the rotary magnetic head 12A terminates. Also simultaneously, the period Kt of the scanning trace HTR of the rotary magnetic head 12B commences. The reference switching signal SWP is used for alternately taking the output signals from the rotary magnetic heads 12A and 12B and for further supplying them to a sampling pulse generator 40.

The sampling pulse generator 40 produces, based on the reference switching signal SWP, a couple of sampling pulses Psp1 and Psp2 appearing respectively at time point t1 and t2 in each of the periods Kt of the scanning trace HTR of the rotary magnetic head 12A and of the scanning trace HTR of the rotary magnetic head 12B, as shown in FIG. 4D. The time point t1 is selected to be earlier by a short period Q than a time point t0 corresponding to the center of each of the periods Kt of the scanning trace HTR: for the rotary magnetic head 12, at the center from the time point ta to the time point tb, and for the magnetic head 12B, at the center from the time point tb to the time point ta. The time point t2 is selected to be later by the short period Q than the time point t0. Accordingly, the sampling pulse Psp1 appears at the time point t1 earlier by the short period Q than the time point t0, and the sampling pulse Psp2 appears at the time point t2 later by the short period Q than the time point t0.

The sampling pulses Psp1 and Psp2 are supplied to the level sampling circuit 37 to which the envelope detection output signals Epba and Epbb obtained from the envelope detecting circuit 36 are also supplied. In the level sampling circuit 37, each of the envelope detection output signals Epba and Epbb is subjected to a level sampling with the sampling pulses Psp1 and Psp2, so that the levels of each of the envelope detection output signals Epba and Epbb at the time points t1 and t2 are sampled out by the sampling pulse Psp1 and Psp2, respectively. A sampled output signal Eso1 corresponding to the level of each of the envelope detection output signals Epba and Epbb sampled at the time point t1 and a sampled output signal Eso2 corresponding to the level of each of the envelope detection output signals Epba and Epbb sampled at the time point t2 are produced, and are supplied to a improper position detecting circuit 41.

In the improper position detecting circuit 41, a difference between the sampled output signals Eso1 and Eso2 is obtained to produce a difference output signal Sdi. The amount of improper positioning of a group of five successive oblique record tracks, which are traversed by the scanning trace HTR of each of the rotary magnetic heads 12A and 12B, is detected relative to the scanning trace HTR in accordance with the difference output signal Sdi on the following theoretical ground.

When the group of five successive oblique record tracks which are traversed by the scanning trace HTR of each of the rotary magnetic heads 12A and 12B is located in correct relation to the scanning trace HTR in the same manner as the oblique record tracks T1 to T5 shown in FIG. 3, each of the envelope detection output signals Epba and Epbb has a peak level portion Pp. This is obtained based on the output signal Spba or Spbb read from one of the successive five oblique record tracks positioned at the center thereof, such as the oblique record track T3 in FIG. 3, at the time point t0 corresponding to the center of the period Kt of the scanning trace HTR, as shown in FIGS. 4A and 4B. Therefore, the sampled output signal Eso1 corresponding to the level of each of the envelope detection output signals Epba and Epbb sampled at the time point t1, and the sampled output signal Eso2 corresponding to the level of each of the envelope detection output signals Epba and Epbb sampled at the time point t2, have substantially the same level. On the other hand, when the group of five successive oblique record tracks which are traversed by the scanning trace HTR, of each of the rotary magnetic heads 12A and 12B is improperly positioned in relation to the scanning trace HTR, each of the envelope detection output signals Epba and Epbb has the peak level portion Pp at a time point earlier or later than the time point t0 corresponding to the center of the period Kt of the scanning trace HTR. Therefore, the sampled output signal Eso1 corresponding to the level of each of the envelope detection output signals Epba and Epbb sampled at the time point t1, and the sampled output signal Eso2 corresponding to the level of each of the envelope detection output signals Epba and Epbb sampled at the time point t2, have respective difference levels each varying in accordance with the amount of improper positioning of the group of five successive oblique record tracks relative to the scanning trace HTR.

Consequently, the difference output signal Sdi, which is produced based on the difference between the sampled output signals Eso1 and Eso2, has its level varying in response to the time point at which the peak level portion Pp of each of the envelope detection output signals Epba and Epbb is positioned in such a manner that the level of the difference output signal Sdi is at the positive maximum when the peak level portion Pp is positioned at the time point t1, zero when the peak level portion Pp is positioned at the time point t0, and at the negative maximum when the peak level portion Pp is positioned at the time point t2, as shown in FIG. 5. In other words, the level of the difference output signal Sdi represents the amount of improper positioning of the group of successive five oblique record tracks relative to the scanning trace HTR, and therefore the difference output signal Sdi is used for detecting the amount of improper positioning of the group of successive five oblique record tracks relative to the scanning trace HTR.

Then, in the detecting circuit 41, a control signal Cdi is produced in response to the amount of of the group of successive five oblique record tracks relative to the scanning trace HTR which is detected in accordance with the difference output signal Sdi, and is supplied to a capstan servocontrol circuit 42. The capstan servocontrol circuit 42 is also supplied with the signal FGcp obtained through an amplifier 43 contained in the servocontrol circuit 21 from the capstan driving block 23.

The capstan servocontrol circuit 42 is operative to produce the capstan control signal Ccp based on both the signal FGcp from the capstan driving block 23 and the control signal Cdi from the improper position detecting circuit 41. The capstan control signal Ccp thus produced is supplied through an amplifier 45 to the capstan driving block 2 for controlling the capstan 34 to drive the magnetic record tape 13 in such a manner that the difference output signal Sdi has its level at zero and therefore the control signal Cdi is not obtained from the improper position detecting circuit 41.

With such control to the capstan driving block 23, each of the rotary magnetic heads 12A and 12B scans the magnetic record tape 13 to form the scanning trace HTR to which the group of five successive oblique record tracks is appropriately positioned. Thus, positions of five successive oblique record tracks traversed by each of the rotary magnetic heads 12A and 12B relative to the scanning trace HTR of each of the magnetic rotary heads 12A and 12B are appropriately set.

The sampling pulses Psp1 and Psp2, with which the level of each of the envelope detecting output signals Epba and Epbb is sampled, are selected to appear respectively at time points earlier and later than a time point corresponding to the center of the period of the scanning trace of each of the rotary magnetic heads 12A and 12B. The peak level portion Pp of each of the envelope detection output signals Epba and Epbb is positioned when the group of successive five oblique record tracks which are traversed by the scanning trace of each of the rotary magnetic heads 12A and 12B is located in correct relation to the scanning trace. In the aforementioned embodiment, it is possible to arrange the sampling pulses Psp1 and Psp2 to appear respectively at other time points. For example, they can appear at time points earlier and later than a time point corresponding to a quarter or three quarters of the period of the scanning trace of each of the rotary magnetic heads 12A and 12B. The minimum level portion of each of the envelope detection output signals Epba and Epbb is then positioned there when the group of five successive oblique record tracks which are traversed by the scanning trace of each of the rotary magnetic heads 12A and 12B is located in correct relation to the scanning trace.

Furthermore, although the scanning trace of each of the rotary magnetic heads 12A and 12B is selected to traverse five successive oblique record tracks on the magnetic record tape 13 in the above-described embodiment, it is also possible to arrange the scanning trace of each of the rotary magnetic heads 12A and 12B to traverse less or more than five successive oblique record tracks on the magnetic record tape 13.

Apart from the above-described embodiment in which the system according to the present invention is applied to the DAT, it is to be understood that the system according to the present invention is applicable also to apparatus having a rotary head device other than the DAT, such as a video tape recorder or the like.

What is claimed is:

1. A system for controlling positions of record tracks relative to a scanning trace, comprising:

head device means for providing a scanning trace by scanning a record tape along a scanning path transverst to record tracks thereon for reading information recorded in the record tracks and for producing an output signal;

envelope detecting means for detecting an envelope of said output signal obtained from the head device means and for producing an envelope detection output signal;

pulse generating means for producing a couple of pulses at predetermined time points in a time period during which the scanning trace of the head device is begun and completed on the record tape;

sampling means for sampling a level of the envelope detection output signal obtained from said envelope detecting means with the couple of pulses produced by said pulse generating means and for producing a couple of sampled output signals;

improper position detecting means for detecting an improper positioning of a group of record tracks traversed by the scanning trace of the head device based on a difference between the sampled output signals obtained from said sampling means, and for producing a control signal based on the improper positioning detected thereby; and tape controlling means for adjusting a travelling speed of the record tape to control positions of the record tracks traversed by the scanning trace of the head device in response to the control signal obtained from said improper position detecting means so that a predetermined difference between the sampled output signals obtained from said sampling means is obtained in said improper position detecting means.

2. A system according to claim 1 wherein said tape controlling means comprises capstan control means for adjusting rotational speed of a capstan which is operative to drive the record tape.

3. A system according to claim 1 wherein the head device is operative to read information from three of the record tracks traversed by the scanning trace of said head device.

4. A system according to claim 3 wherein said record tape is a magnetic record tape and said head device comprises a pair of rotary magnetic heads having respective different gap azimuth angles selected for scanning alternately the magnetic record tape, each of said rotary magnetic heads being arranged to scan the magnetic record tape with a scanning trace traversing five successive record tracks on the magnetic record tape.

5. A system for controlling positions of record tracks relative to a scanning trace, comprising:

head device means for providing a scanning trace by scanning a record tape along a scanning path transverse to record tracks thereon for reading information recorded in the record tracks and for producing an output signal;

envelope detecting means for detecting an envelope of said output signal obtained from the head device means and for producing an envelope detection output signal;

pulse generating means for producing a couple of pulses at predetermined time points in a time period during which the scanning trace of the head device is begun and completed on the record tape;

sampling means for sampling a level of the envelope detection output signal obtained from said envelope detecting means with the couple of pulses produced by said pulse generating means and for producing a couple of sampled output signals;

improper position detecting means for detecting an improper positioning of a group of record tracks traversed by the scanning trace of the head device based on a difference between the sampled output signals obtained from said sampling means, and for producing a control signal based on the improper positioning detected thereby;

tape controlling means for adjusting a travelling speed of the record tape to control positions of the record tracks traversed by the scanning trace of the head device in response to the control signal obtained from said improper position detecting means so that a predetermined difference between the sampled output signals obtained from said sampling means is obtained in said improper position detecting means; and said pulse generating means causing one of the pulses to appear at a time point selected to be earlier by a predetermined period and the other of the pulses to appear at a time point selected to be later by the predetermined period than a time point corresponding to a center of the time period during which the scanning trace of the head device is begun and completed on the record tape.

6. A system for controlling positions of record tracks relative to a scanning trace, comprising:

head device means for providing a scanning trace by scanning a record tape along a scanning path transverse to record tracks thereon for reading information recorded in the record tracks and for producing an output signal;

envelope detecting means for detecting an envelope of said output signal obtained from the head device means and for producing an envelope detection output signal;

pulse generating means for producing a couple of pulses at predetermined time points in a time period during which the scanning trace of the head device is begun and completed on the record tape;

sampling means for sampling a level of the envelope detection output signal obtained from said envelope detecting means with the couple of pulses produced by said pulse generating means and for producing a couple of sampled output signals;

improper position detecting means for detecting an improper positioning of a group of record tracks traversed by the scanning trace of the head device based on a difference between the sampled output signals obtained from said sampling means, and for producing a control signal based on the improper positioning detected thereby;

tape controlling means for adjusting a travelling speed of the record tape to control positions of the record tracks traversed by the scanning trace of the head device in response to the control signal obtained from said improper position detecting means so that a predetermined difference between the sampled output signals obtained from said sampling means is obtained in said improper position detecting means; and said pulse generating means causing one of the pulses to appear at a time point selected to be earlier by a predetermined period and the other of the pulses to appear at a time point selected to be later by the predetermined period than a time point corresponding to a center of the time period during which the scanning trace of the head device is begun and completed on the record tape.

7. A system for controlling positions of record tracks relative to a scanning trace, comprising:

head device means for providing a scanning trace by scanning a record tape along a scanning path transverse to record tracks thereon for reading information recorded in the record tracks and for producing an output signal;

envelope detecting means for detecting an envelope of said output signal obtained from the head device means and for producing an envelope detection output signal;

pulse generating means for producing a couple of pulses at predetermined time points in a time period during which the scanning trace of the head device is begun and completed on the record tape;

sampling means for sampling a level of the envelope detection output signal obtained from said envelope detecting means with the couple of pulses produced by said pulse generating means and for producing a couple of sampled output signals;

improper position detecting means for detecting an improper positioning of a group of record tracks traversed by the scanning trace of the head device based on a difference between the sampled output signals obtained from said sampling means, and for producing a control signal based on the improper positioning detected thereby;

tape controlling means for adjusting a travelling speed of the record tape to control positions of the record tracks traversed by the scanning trace of the head device in response to the control signal obtained from said improper position detecting means so that a predetermined difference between the sampled output signals obtained from said sampling means is obtained in said improper position detecting means; and said pulse generating means causing one of the pulses to appear at a time point selected to be earlier by a predetermined period and the other of the pulses to appear at a time point selected to be later by the predetermined period than a time point corresponding to three quarters of the time period during which the scanning trace of the head device is begun and completed on the record tape.

8. A system for controlling positions of record tracks relative to a scanning trace, comprising:

head device means for providing a scanning trace by scanning a record tape along a scanning path transverse to record tracks thereon for reading information recorded in the record tracks and for producing an output signal;

envelope detecting means for detecting an envelope of said output signal obtained from the head device means and for producing an envelope detection output signal;

pulse generating means for producing first and second spaced pulses at first and second predetermined time points in a time period during which the scanning trace of the head device is begun and completed on the record tape;

sampling means for sampling a level of the envelope detection output signal obtained from said envelope detecting means with the first and second pulses produced by said pulse generating means and for producing first and second corresponding sampled output signals;

improper position detecting means for detecting improper positioning of a group of record tracks traversed by the scanning trace of the head device based on a comparison of the first and second sampled output signals obtained from said sampling means, and for producing a control signal based on the improper positioning detected thereby; and tape controlling means for adjusting a travelling speed of the record tape to control positions of the record tracks traversed by the scanning trace of the head device in response to the control signal obtained from said improper position detecting means.

9. A system according to claim 8 wherein the head device means provides the scanning trace so that it will cover a plurality of tracks in a fast forward mode of operation.

* * * * *